J. T. KOTECKI.
VEHICLE SIGNAL.
APPLICATION FILED OCT. 13, 1916.

1,356,635.

Patented Oct. 26, 1920.
2 SHEETS—SHEET 1.

Witnesses:
C. E. Wessels
O. A. Olson

Inventor:
James T. Kotecki,
By Joshua R. H. Potts
his Attorney.

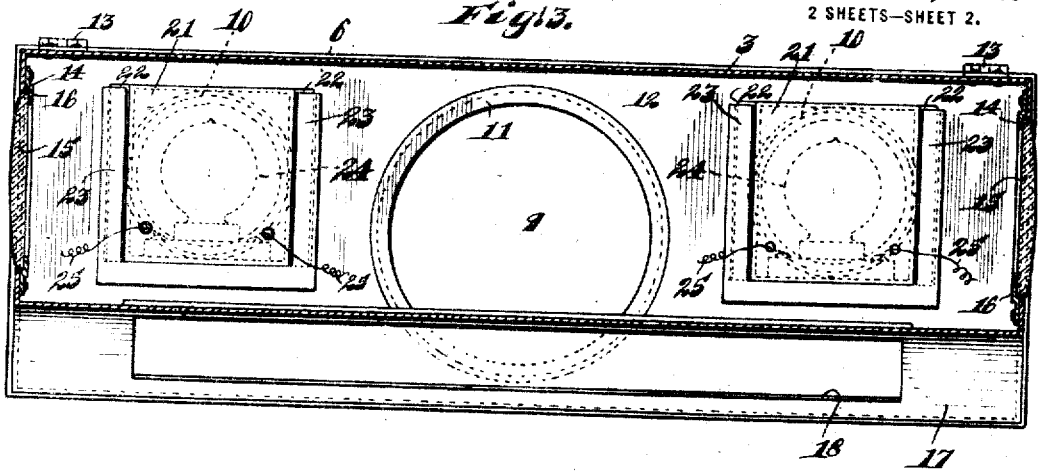
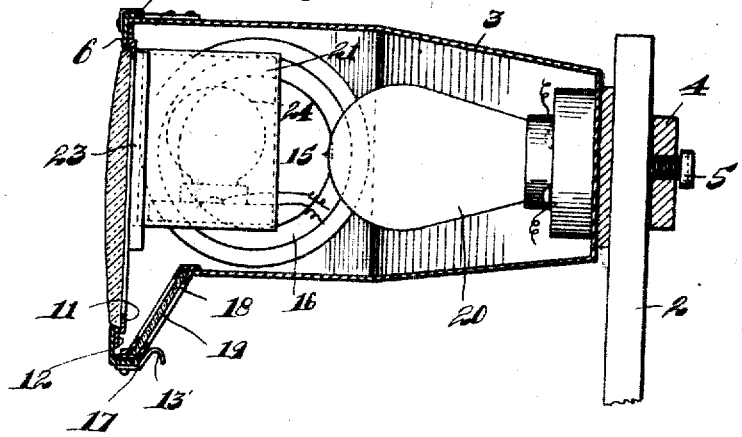

UNITED STATES PATENT OFFICE.

JAMES THEODORE KOTECKI, OF CHICAGO, ILLINOIS.

VEHICLE-SIGNAL.

1,356,635.   Specification of Letters Patent.   Patented Oct. 26, 1920.

Application filed October 13, 1916. Serial No. 125,508.

*To all whom it may concern:*

Be it known that I, JAMES T. KOTECKI, a citizen of the United States, and a resident of the city of Chicago, county of Cook, and State of Illinois, have invented certain new and useful Improvements in Vehicle-Signals, of which the following is a specification.

My invention relates to improvements in vehicle signaling devices designed for use especially upon automobiles to serve the double function of a rear or tail light, and means for signaling vehicles behind as to contemplated movements of the vehicle upon which the device is arranged.

The object of my invention is the production of a device of the character mentioned which will be of durable and economical construction and efficient in use.

Other objects will appear hereinafter.

The invention consists in the combinations and arrangements of parts hereinafter described and claimed.

Figure 1:
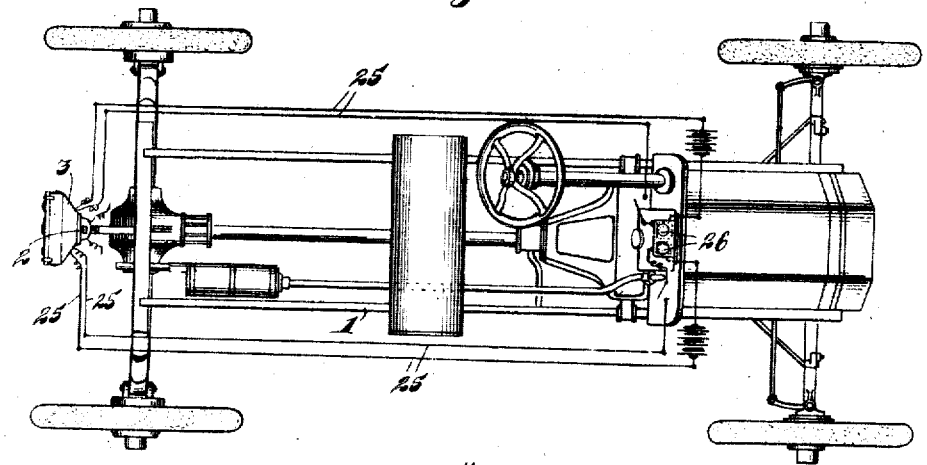
Figure 2:
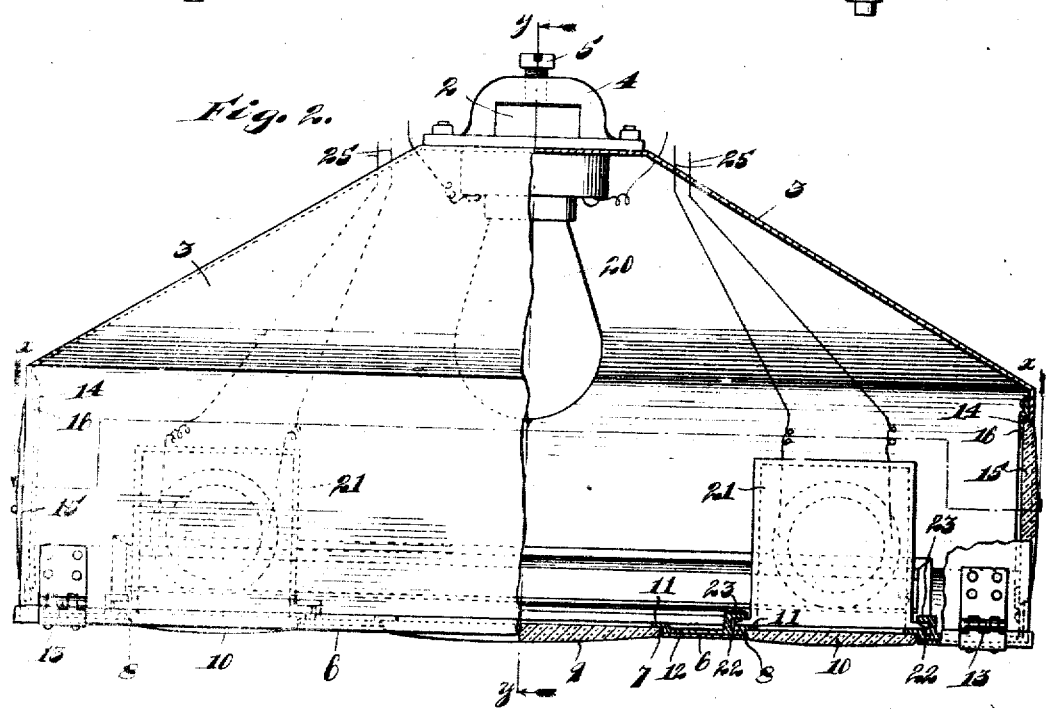

The invention will be best understood by reference to the accompanying drawings forming a part of this specification, and in which, Figure 1 is a top plan view of the chassis of a conventional automobile equipped with a signaling device embodying the invention, Fig. 2 is a partially sectional top plan view of the device detached, and Figs. 3 and 4 are sections taken on substantially lines $x$—$x$ and $y$—$y$ respectively of Fig. 2.

The preferred form of construction, as illustrated in the drawings, is designed for use especially in connection with an automobile illustrated at 1 in Fig. 1. The device, when in use, is arranged at the rearward end of the vehicle, as shown, upon a suitable bracket 2 provided for the purpose. The device comprises a body 3 preferably of sheet metal which is substantially rectangular in form at its rearward end, the forward end thereof tapering, as seen, and being provided with a suitable socket 4 for engagement with the supporting bracket 2, a screw 5 being shown for locking the device to said bracket.

The rearward end of the housing 3 is open, the same being provided with a door 6 in which are formed a central circular opening 7 and side circular openings 8. Mounted in the openings 7 and 8 are lenses 9 and 10 respectively, the lens 9 being preferably colored red, whereas the lenses 10 are preferably colored green. The lenses 9 and 10 are locked in position in the openings 7 and 8 of door 6, through engagement therewith of circular flanges 11 which are formed upon a plate 12 secured to the rearward side of the door.

Said door 6 is hingedly connected at its upper edge, as at 13, with the top wall of housing 3 so as to permit of said door swinging rearwardly and upwardly. The lower or free edge of the door is provided with a suitable locking device 13' which is adapted to hold the door in closed or operative position, when the device is in use.

Provided in the end or side walls of the housing 3 are circular openings 14 in which are arranged lenses 15 also preferably colored green. Said lenses 15 are locked in position in the openings 14 by means of annular flanges 16 which are secured to the inner sides of the end or side walls of the housing, as clearly shown in Figs. 2 and 3.

Provided at the rearward end of the housing 3, at the under side thereof, is a downwardly offset portion 17 in which is formed a rearwardly and downwardly facing window or elongated slot 18. The window 18 is covered by a colorless glass 19, which is suitably fastened in position.

Mounted in the housing 3, at the rearward end thereof, is an electric light 20 which, when the device is in use, will be supplied with current from any suitable source. Mounted at the inner side of the door 6, behind each of the lenses 10, is a holder or shield 21 preferably substantially rectangular in form and closed at all sides except that adjacent the lens. Each of the holders 21 is formed with laterally projecting flanges 22 which are adapted for slidable interlocking with flanges 23 which are provided upon the inner side of said door. The arrangement is such that the holders 21 will be held securely in position upon the inner side of the door, the same being adapted for removal or detachment only upon swinging of the door outwardly to horizontal or upwardly extending position. When this is done, the holders may be slid relatively to the door so as to effect disengagement of the flanges 22 from the flanges 23. When the door is in lowered or operative position, it is of course apparent that the holders will be locked against detachment.

Mounted in each of the holders 21 is an electric light 24. Each of the lights 24 is provided with an independent circuit, the circuit wires 25 of each of said lights extending forwardly along the vehicle to accommodate a pilot light 26 which is arranged in series with each of said lights 24. The pilot lights 26 are arranged upon the dash-board of the vehicle or other suitable location where the same may be readily observed by the driver of the vehicle, said pilot lights thus serving as a means of advising the driver whether or not the lights 24 are in operation, since the lights 26 will operate simultaneously with the lights 24 when the circuits of the latter are closed. Suitable push buttons or switches will be interposed in the circuit wires 25 which will be located for convenient operation by the driver to open and close said circuits.

With the construction set forth, it will be seen that when the device is in use, the light 20 will serve to illuminate the lens 9 which will serve as a tail light for the vehicle, and also the lenses 15 which will serve as side lights. The lights 24, which are arranged in independent manually controlled circuits, afford means for signaling to vehicles behind of contemplated turning by the driver of the vehicle upon which the device is used, the arrangement being such, as will be seen, that by closing the circuit through the right hand light, it will serve to advise those behind of the intention of the driver to turn to the right, and closing of the circuit through the left hand light 24, will serve to advise those behind that the driver intends to turn to the left. The lenses 10 will be unlighted except during signaling, as just described, the holders or shields 21 serving to prevent the light from lamp 20 illuminating said lenses.

The rearwardly and downwardly opening window 18 affords means of illumination for a license number which may be supported below the device, as will be readily understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A signaling device comprising a housing; a swinging door at the rear side of said housing; a plurality of lenses in said door; flanges arranged on said door and spaced therefrom along one side, said flanges being arranged U-shaped, the base of said U being adjacent the lower edge of said door; means for illuminating said lenses, said means being contained in a holder open at one side, flanges projecting laterally from said side of said holder and adapted to interlock with the spaced side portions of said first mentioned flanges to secure said holder in position, substantially as described.

In testimony whereof I have signed my name to this specification in the presence of two subscribing witnesses.

JAMES THEODORE KOTECKI

Witnesses:
JNO. A. FERGUSON,
HELEN F. LILLIS.